United States Patent
Zou et al.

(10) Patent No.: US 11,689,377 B2
(45) Date of Patent: Jun. 27, 2023

(54) POWER CONTROL OF POWERED DEVICES IN A SYSTEM WITH POWER OVER THE ETHERNET

(71) Applicant: Maxim Integrated Products, Inc., San Jose, CA (US)

(72) Inventors: Gaoling Zou, San Jose, CA (US); Yangyang Wen, Austin, TX (US); Harrison Zhang, HangZhou (CN); Qicheng Huang, San Jose, CA (US); Antonio Panebianco, Aci Sant Antonio (IT); Salvatore G. Pastorina, Catania (IT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/468,005

(22) Filed: Sep. 7, 2021

(65) Prior Publication Data

US 2022/0103383 A1    Mar. 31, 2022

Related U.S. Application Data

(60) Provisional application No. 63/085,988, filed on Sep. 30, 2020.

(51) Int. Cl.
| | |
|---|---|
| *G06F 1/00* | (2006.01) |
| *H04L 12/10* | (2006.01) |
| *G06F 1/3234* | (2019.01) |
| *G06F 1/3296* | (2019.01) |

(52) U.S. Cl.
CPC .......... *H04L 12/10* (2013.01); *G06F 1/3278* (2013.01); *G06F 1/3296* (2013.01)

(58) Field of Classification Search
CPC ....... H04L 12/10; G06F 1/3296; G06F 1/3287
See application file for complete search history.

(56) References Cited

U.S. PATENT DOCUMENTS

| | | | |
|---|---|---|---|
| 9,900,164 B2 | 2/2018 | Spiel et al. | |
| 10,389,540 B2* | 8/2019 | Buchanan | ......... H04L 12/40045 |
| 10,528,112 B2 | 1/2020 | Darshan | |
| 11,533,196 B2* | 12/2022 | Cananzi | ............ H04L 12/40052 |
| 2007/0085675 A1* | 4/2007 | Darshan | ................. H04L 12/10 307/3 |
| 2010/0117808 A1* | 5/2010 | Karam | .................... H04L 12/10 713/300 |
| 2012/0313528 A1* | 12/2012 | Chen | ..................... H05B 47/23 315/121 |

(Continued)

*Primary Examiner* — Mohammed H Rehman
(74) *Attorney, Agent, or Firm* — Kevin E. West; Advent, LLP

(57) ABSTRACT

A powered device interface includes a supply sensing circuit, a demand sensing circuit, and a control circuit. The supply sensing circuit is configured to sense an amount of power received by the powered device from at least one power source equipment over an ethernet cable. The demand sensing circuit is configured to sense a power demand requested by the powered device. The control circuit is coupled with the supply sensing circuit and the demand sensing circuit and is configured to cause the power demand requested by the powered device to be reduced when the power demand requested by the powered device exceeds the amount of power allowed by the power source equipment for the powered device.

19 Claims, 7 Drawing Sheets

(56) References Cited

U.S. PATENT DOCUMENTS

| | | | |
|---|---|---|---|
| 2012/0313529 A1* | 12/2012 | Chen | H05B 47/23 |
| | | | 315/121 |
| 2020/0076628 A1* | 3/2020 | Yam | G06F 1/28 |
| 2020/0159307 A1* | 5/2020 | Roy | G06F 1/3209 |
| 2020/0252225 A1* | 8/2020 | Liu | G06F 1/266 |
| 2022/0158857 A1* | 5/2022 | German | H04L 12/10 |

* cited by examiner

POWER CONTROL OF POWERED DEVICES IN A SYSTEM WITH POWER OVER THE ETHERNET

BACKGROUND

Power over Ethernet (PoE) technology describes passing electrical power, along with data, on Ethernet cabling. Power Sourcing Equipment (PSE) provides or sources power to a Powered Device (PD) over one or more twisted pairs of cables supported by the Ethernet cable. The twisted pairs of cables can transfer power, data, or both power and data from the PSE to the PD. As capabilities of Powered Devices increase, the power demands for such devices often increase, where more twisted pairs of cables are used to transfer the power. Examples of powered devices include wireless access points, Internet Protocol (IP) telephones, IP cameras, retail sales displays, out-door units (ODU), and network routers.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
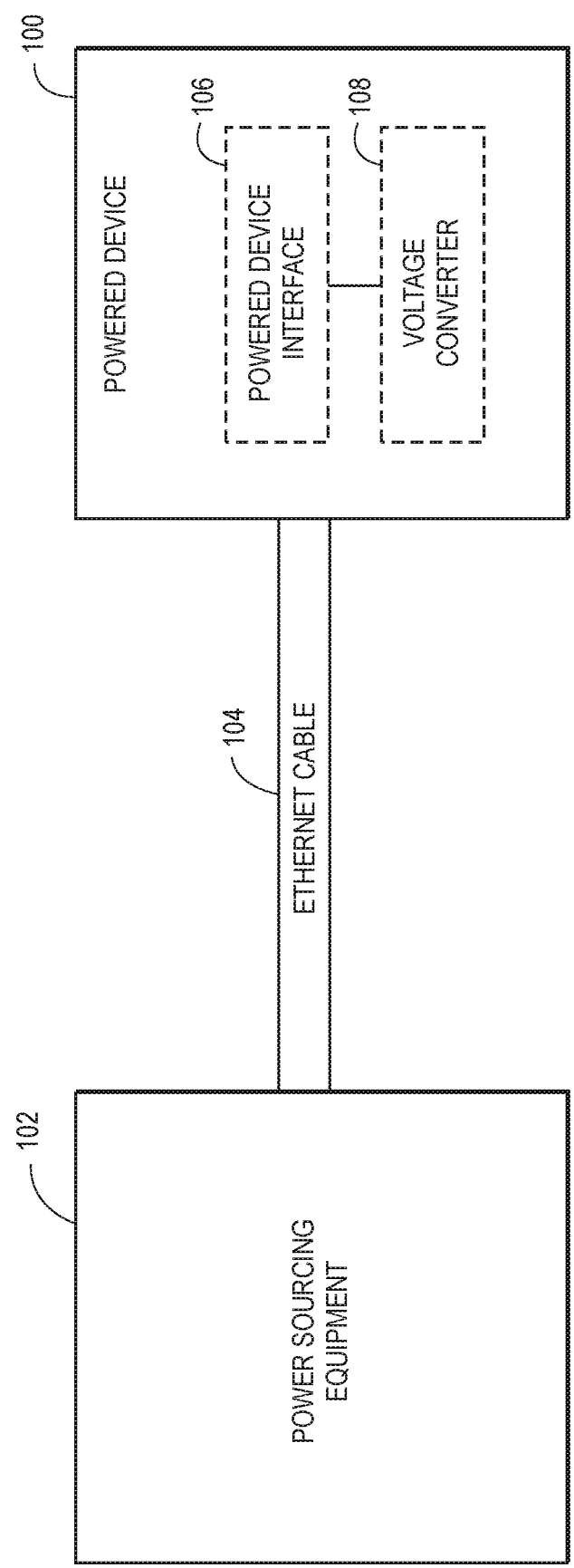
FIG. 1 is a block diagram representation of an example of a power over ethernet (PoE) system including an embodiment of a powered device interface of a powered device.

Power over ethernet (PoE) systems include power sourcing equipment (PSE) connected to a powered device (PD) via Ethernet cabling that includes multiple twisted pairs of Ethernet cables over which power and data are transferred from the PSE to the PD. Such systems may be utilized for PDs that operate with data to and from a network and utilize power for sustained operations. For example, PDs that are positioned remotely from other sources of power (e.g., direct electrical power cabling to a power source or electrical power outlet) can obtain power from PSEs via the Ethernet cabling without fully depending on battery back-up or other electrical power supplies.

Power supplied by PSEs may diminish as power is transferred over Ethernet cabling due to resistive losses over the length of Ethernet cabling. In general, as the length of Ethernet cabling increases between a PSE and a PD, the more power lost during transmission to the input side of the PD. If a PD requires more power than is available at the input side, the PSE may cease to supply power to the PD due to current protection when the PD runs in full load operation. For example, a PD that draws more current than allowed by a PSE may be turned off by the PSE. If the PoE system includes multiple PSEs, the PSEs may cease to supply power to the PD if a portion of the PD requires more power than is available from a single PSE of the group of PSEs. This interruption of power supply from the PSE is disruptive for the operations of PDs, particularly those with no back-up power source.

In an embodiment, a powered device interface includes a supply sensing circuit, a demand sensing circuit, and a control circuit. The supply sensing circuit is configured to sense an amount of power allowed by at least one power source equipment over an ethernet cable. The demand sensing circuit is configured to sense a power demand requested by the powered device. The control circuit is coupled with the supply sensing circuit and the demand sensing circuit and is configured to cause the power demand requested by the powered device to be reduced when the power demand requested by the powered device exceeds the amount of power allowed by the power source equipment for the powered device via reduction of at least one of the functionality of the powered device or the functionality of a system in which the powered device is operating.

In an embodiment, a powered device in a system employing power over ethernet includes a powered device interface and a voltage converter. The powered device interface includes a supply sensing circuit configured to sense an amount of power allowed by the power source equipment for the powered device from at least one power source equipment over an ethernet cable, a demand sensing circuit configured to sense a power demand requested by the powered device, and a control circuit coupled with the supply sensing circuit and the demand sensing circuit. The control circuit is configured to cause the power demand requested by the powered device to be reduced when the power demand requested by the powered device exceeds the amount of power allowed by the power source equipment for the powered device via reduction of at least one of the functionality of the powered device or the functionality of a system in which the powered device is operating. The voltage converter is coupled with the powered device interface at a front end of the voltage converter. The voltage converter is configured to receive an output from the control circuit to reduce the power demand requested by the powered device when the power demand requested by the powered device exceeds the amount of power allowed by the power source equipment for the powered device.

In an embodiment, a method for limiting power requested by a powered device in a system employing power over ethernet includes sensing, via a supply sensing circuit, an amount of power allowed by the power source equipment for the powered device from at least one power source equipment over an ethernet cable, sensing, via a demand sensing circuit, a power demand requested by the powered device, and reducing the power demand requested by the powered device, via a control circuit coupled with the supply sensing circuit and the demand sensing circuit configured to reduce of at least one of the functionality of the powered device or the functionality of a system in which the powered device is operating, when the power demand requested by the powered device exceeds the amount of power received by the powered device.

Example Implementations

Referring to FIG. 1, a block diagram representation of a powered device (PD) 100 coupled with power sourcing equipment (PSE) 102 by an Ethernet cable 104 is shown. The PSE 102 supplies power and data to the PD 100 via the Ethernet cable 104. An example of the PSE 102 includes, but is not limited to, a network switch. Examples of the PD 100 include, but are not limited to, wireless access points, Internet Protocol (IP) telephones, IP cameras, retail sales displays, out-door units (ODU), and network routers. The PD 100 includes a powered device interface 106 and a voltage converter 108 to manage operations of the PD 100 responsive to power received from the PSE 102.

The powered device interface 106 senses an amount of power allowed by the PSE 102 for the PD 100 over the Ethernet cable 104. In an embodiment, the powered device interface 106 includes a supply sensing circuit to sense the amount of power available to the PD 100 from the PSE 102 over the Ethernet cable 104. The amount of power available to the PSE 102 is sensed at the input side of the PD 100 following transfer through the Ethernet cable 104. The power sensed by the power device interface 106 accounts for losses in power during transit through the Ethernet cable 104 and represents the actual amount of power available to the PD 100 rather than the amount of power leaving the PSE 102. In an embodiment, the powered device interface 106 senses the amount of power available to the PD 100 by sensing a current received by the PD 100 over the Ethernet cable 104 from the PSE 102.

The powered device interface 106 senses a power demand requested from the PD 100 for transfer of power by the PSE 102 over the Ethernet cable 104. In an embodiment, the powered device interface 106 includes a demand sensing circuit to sense the power demand requested from the PD 100. The power demand may be attributed to a total number of processes or functions undertaken by the PD 100 including, but not limited to, a processing speed of the PD 100 or a number of concurrent tasks managed by the PD 100. The power demand may be attributed to operation of the PD 100, operation of one or more components of a system in which the PD 100 is operating (e.g., cooling components, heating components, lighting components, telecommunication components, camera or imaging components), or combinations thereof. For example, the PD 100 may request 60 W of power to function at a maximum level of functionality of the PD 100, however the power demand is not limited to the 60 W value and can be less than 60 W, greater than 60 W, or a value that changes over time for the PD 100 dependent on the real time activities of the PD 100.

In an embodiment, the powered device interface 106 may reduce the power demand requested by the PD 100 if the actual power received from the PSE 102 is insufficient to meet the power demand. For example, if the power demand requested by the PD 100 exceeds the amount of power available to the PD 100 (e.g., sensed at the input side of the PD 100), the powered device interface 106 reduces the power demand requested by the PD 100. The power demand requested by the PD 100 can be reduced to bring the power demand within the amount of power available to the PD 100, which can prevent the PSE 102 from shutting off power supply to the PD 100. In an embodiment, the powered device interface 106 includes a control circuit coupled with the supply sensing circuit and the demand sensing circuit to reduce the power demand requested by the PD 100 when the power demand requested by the PD 100 exceeds the amount of power available to the PD 100 from the PSE 102 over the Ethernet cable 104. In an embodiment, the control circuit transmits an output to a front end of the voltage converter 108 to reduce the power demand requested by the PD 100 when the power demand requested by the PD 100 exceeds the amount of power available to the PD 100. An example voltage converter 108 includes, but is not limited to, a DC-DC converter.

In an embodiment, the powered device interface 106 causes the power demand requested by the PD 100 to be reduced when the power demand requested by the PD 100 exceeds the amount of power available to the PD 100 by limiting current utilized by the PD 100. In an embodiment, the powered device interface 106 causes the power demand requested by the PD 100 to be reduced when the power demand requested by the PD 100 exceeds the amount of power available to the PD 100 by reducing of the functionality of the PD 100 or the functionality of a system in which the PD 100 is operating. Examples of reductions in functionality include, but are not limited to, a reduction in processing speed of the PD 100, a reduction in a number of concurrent tasks managed by the PD 100, or turning off or reducing power draw of system components (e.g., heating components, cooling components, lighting components, telecommunication components, camera or imaging resolution, camera or imaging speed).

Figure 2:
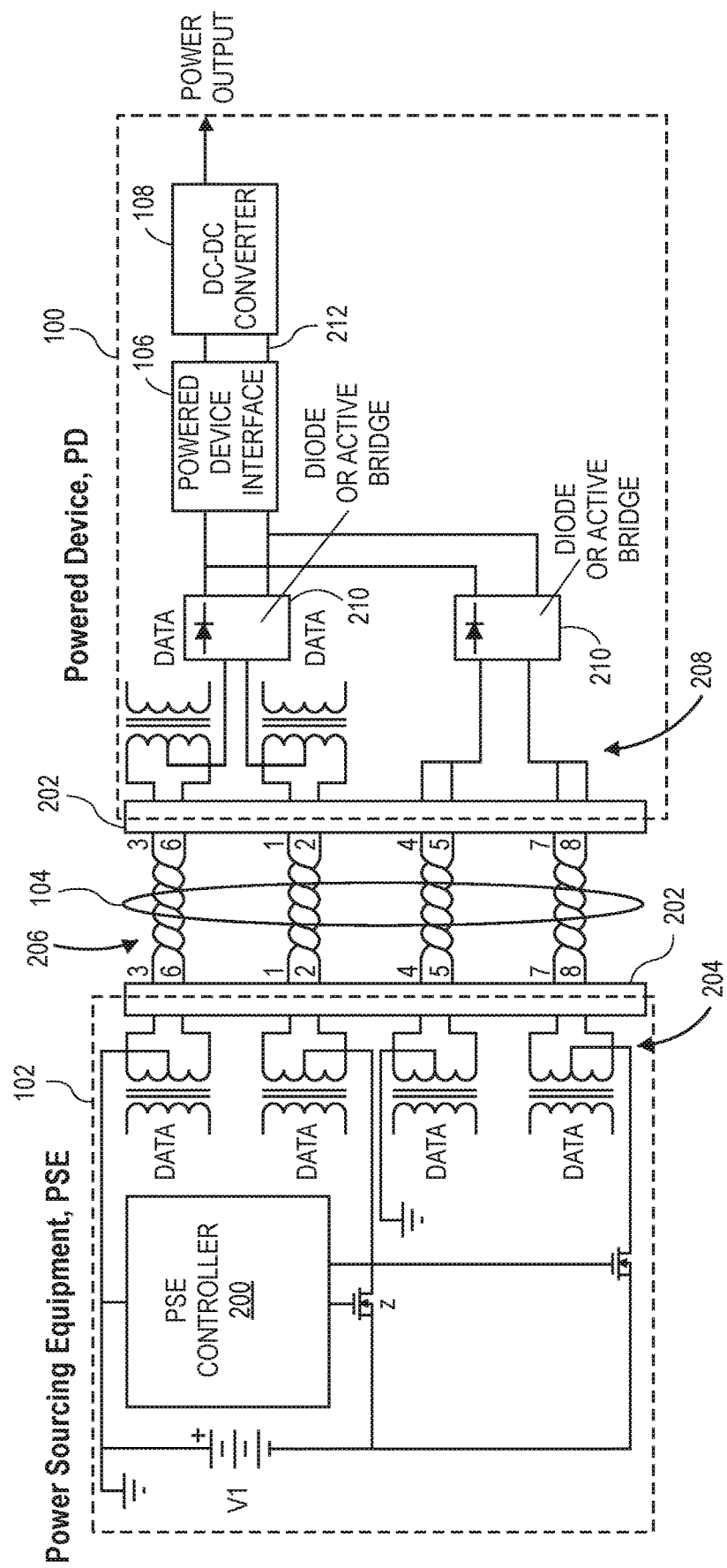
FIG. 2 is a block diagram representation of an example of a PoE system including an embodiment of a powered device interface of a powered device.
Figure 3:
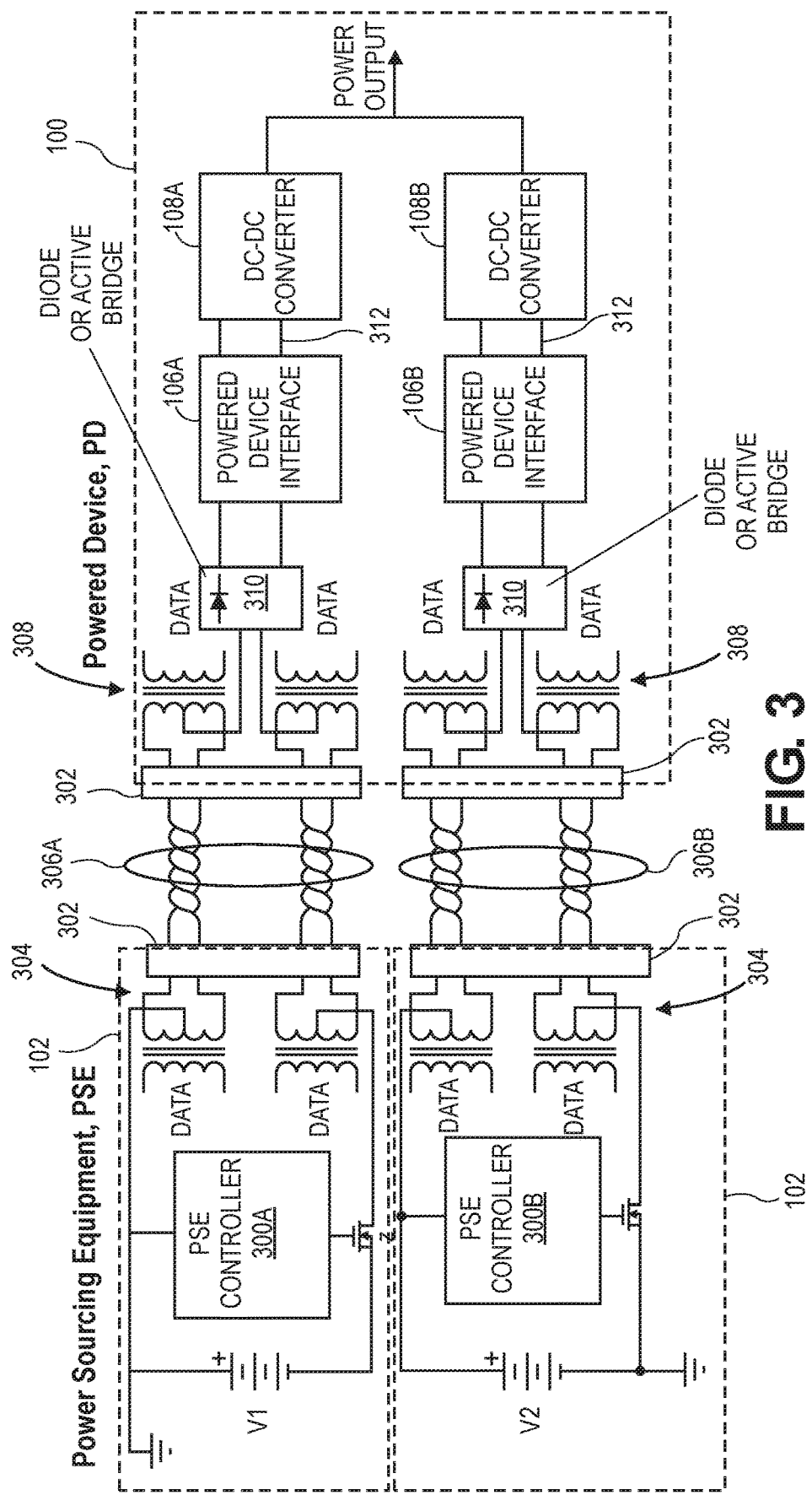
FIG. 3 is a block diagram representation of an example of a PoE system including an embodiment of a powered device interface of a powered device.

The PSE 102 can include one or more power source controllers, with FIG. 2 providing an example of an embodiment with a single power source controller and with FIG. 3 providing an example of an embodiment with multiple power source controllers.

Referring to FIG. 2, a block diagram representation of an example of a PoE system including an embodiment of the powered device interface 106 of the PD 100 is shown. The PSE 102 includes a single PSE controller 200 configured to send power and data to the PD 100 over the Ethernet cable 104. The Ethernet cable 104 is coupled between connectors 202 of the PSE 102 and the PD 100. An example of the connectors 202 includes, but is not limited to, an RJ45 connector. The PSE controller 200 outputs data and power through connections 204 to the connector 202 of the PSE 102 where pairs of twisted cables 206 transfer the data and power to the connector 202 of the PD 100. The PD 100 includes connections 208 coupled to the connector 202 to receive the power and data transferred through the pairs of twisted cable 206 of the Ethernet cable 104. The connections 204 and 208 can include, but are not limited to, transducers and electrical wiring. The PD 100 includes a diode or active bridge 210 coupled between the connections 208 and the powered device interface 106. In an embodiment, the powered device interface 106 senses the power available to the input side of the PD 100 by sensing power received from the diode or active bridges 210. In an embodiment, the powered device interface 106 compares the amount of power received from the diode or active bridges 210 to the power demand of the PD 100 to determine whether the power demand exceeds the actual amount of power allowed by the PSE 100. When the power demand requested by the PD 100 exceeds the amount of power available to the PD 100, the powered device interface 106 reduces the power demand requested by the PD 100. In an embodiment, the powered device interface 106 transmits an output to a front end of the voltage converter 108 via one or more connections 212 to reduce the power demand requested by the PD 100 when the power demand requested by the PD 100 exceeds the amount of power available to the PD 100.

Referring to FIG. 3, a block diagram representation of an example of a PoE system with multiple PSE controllers is shown. The PSE 102 is shown including a first PSE controller 300A and a second PSE controller 300B. The first PSE controller 300A outputs data and power through connections 304 to the connector 302 of the PSE 102 where pairs of twisted cables 306A transfer the data and power to the connector 302 of the PD 100. An example of the connectors 302 includes, but is not limited to, an RJ45 connector. The second PSE controller 300B outputs data and power through connections 304 to the connector 302 of the PSE 102 where pairs of twisted cables 306B transfer the data and power to the connector 302 of the PD 100. The PD 100 includes connections 308 coupled to the connector 302 to receive the power and data transferred through the pairs of twisted cable 306A, 306B of the Ethernet cable 104. The connections 304 and 308 can include, but are not limited to, transducers and electrical wiring. The PD 100 includes a diode or active bridge 310 coupled between the connections 308 and the powered device interface 106. In an embodiment, the powered device interface 106 includes a first powered device interface 106A configured to receive power transferred from the first PSE controller 300A and a second powered device interface 106B configured to receive power from the second PSE controller 300B.

In an embodiment, the powered device interfaces 106A and 106B sense the power received at the input side of the PD 100 by sensing power received from the diode or active bridges 310. In an embodiment, the powered device interface 106A compares the amount of power received from the diode or active bridges 310 (i.e., sourced from the first PSE controller 300A) to the power demand of the PD 100 to determine whether the power demand exceeds the actual amount of power received from the first PSE controller 300A. When the power demand requested by the PD 100 exceeds the amount of power available to the PD 100, the powered device interface 106A reduces the power demand requested by the PD 100. In an embodiment, the powered device interface 106A transmits an output to a front end of the voltage converter 108A via one or more connections 312 to reduce the power demand requested by the PD 100 when the power demand requested by the PD 100 exceeds the amount of power allowed by the first PSE controller 300A.

In an embodiment, the powered device interface 106B compares the amount of power received from the diode or active bridges 310 (i.e., sourced from the second PSE controller 300B) to the power demand of the PD 100 to determine whether the power demand exceeds the actual amount of power received from the second PSE controller 300B. When the power demand requested by the PD 100 exceeds the amount of power available to the PD 100, the powered device interface 106B reduces the power demand requested by the PD 100. In an embodiment, the powered device interface 106B transmits an output to a front end of the voltage converter 108B via one or more connections 312 to reduce the power demand requested by the PD 100 when the power demand requested by the PD 100 exceeds the amount of power allowed by the second PSE controller 300B.

The powered device interfaces 106A and 106B can control the power demands of the PD 100 to prevent shutdown of power from the PSE 102 to the PD 100 in the event that power from one or both of the PSE controllers 300A or 300B is insufficient to power a present demand from the PD 100.

For instance, the powered device interface 106A or 106B can reduce the demand from the PD 100 for the powered device interfaces 106A or 106B that sense the power allowed by one or both of the PSE controllers 300A or 300B is insufficient. As an example scenario, each of the PSE controllers 300A and 300B can supply 30 W to the PD 100 for a total of about 60 W (provided no losses during transit over the Ethernet cable 104). If the powered device interface 106A senses a power demand of 35 W and the powered device interface 106B senses a power demand of 25 W, the powered device interface 106A can limit the power demand of 35 W to 30 W to prevent the PSE 102 from ceasing current to the PD 100 due to the power demand of 35 W exceeding the 30 W supply from the PSE controller 300A. In the meantime, the powered device interface 106A or 106B could assert an ALERT signal (e.g., via an alert circuit, shown in FIG. 5A) to let the system react accordingly by turning off or reducing power draw of system components to reduce power consumption to a total of 30 W plus 25 W. While the example scenario is described with the power supply and power demand values listed, the values for the PD 100 and the PSE 102 are not limited to the values listed and can include values that exceed or are less than the values listed.

Figure 4:
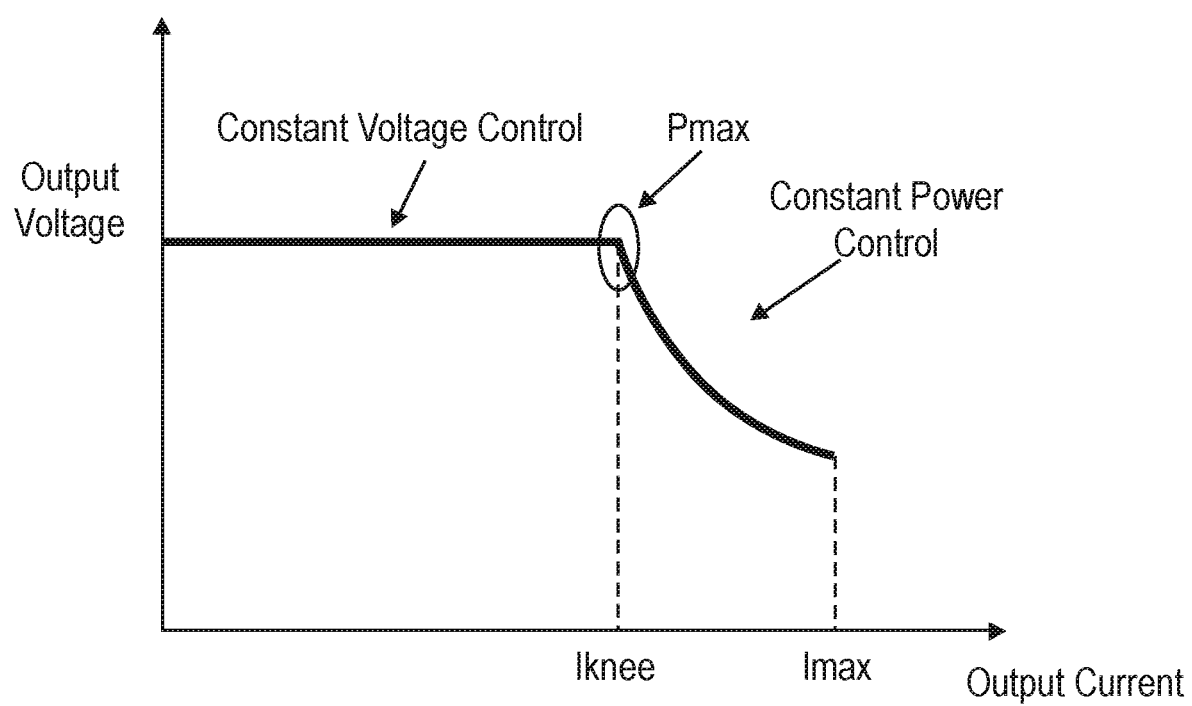
FIG. 4 is a chart of output voltage versus output current for power received from power souring equipment (PSE) by a powered device in a PoE system with an embodiment of power control by a powered device interface.

Referring to FIG. 4, a chart of output voltage versus output current for power received from the PSE 102 by the PD 100 is shown. As the power demand from the PD 100 is less than the maximum power permitted by the PSE 102 (shown as "Pmax"), the powered device interface 106 can implement a constant voltage control of the PD 100. If the current increases (e.g., through increased demand by the PD 100), the powered device interface 106 can implement a voltage control to limit the voltage out from the PSE 102. For example, as current increases beyond the current level associated with the maximum power at a given output voltage (e.g., the current increases beyond "Iknee"), the powered device interface 106 can implement a constant power control to limit the output voltage and maintain the PD 100 beneath the maximum current permitted by the PSE 102 (show as "Imax").

Figure 5A:
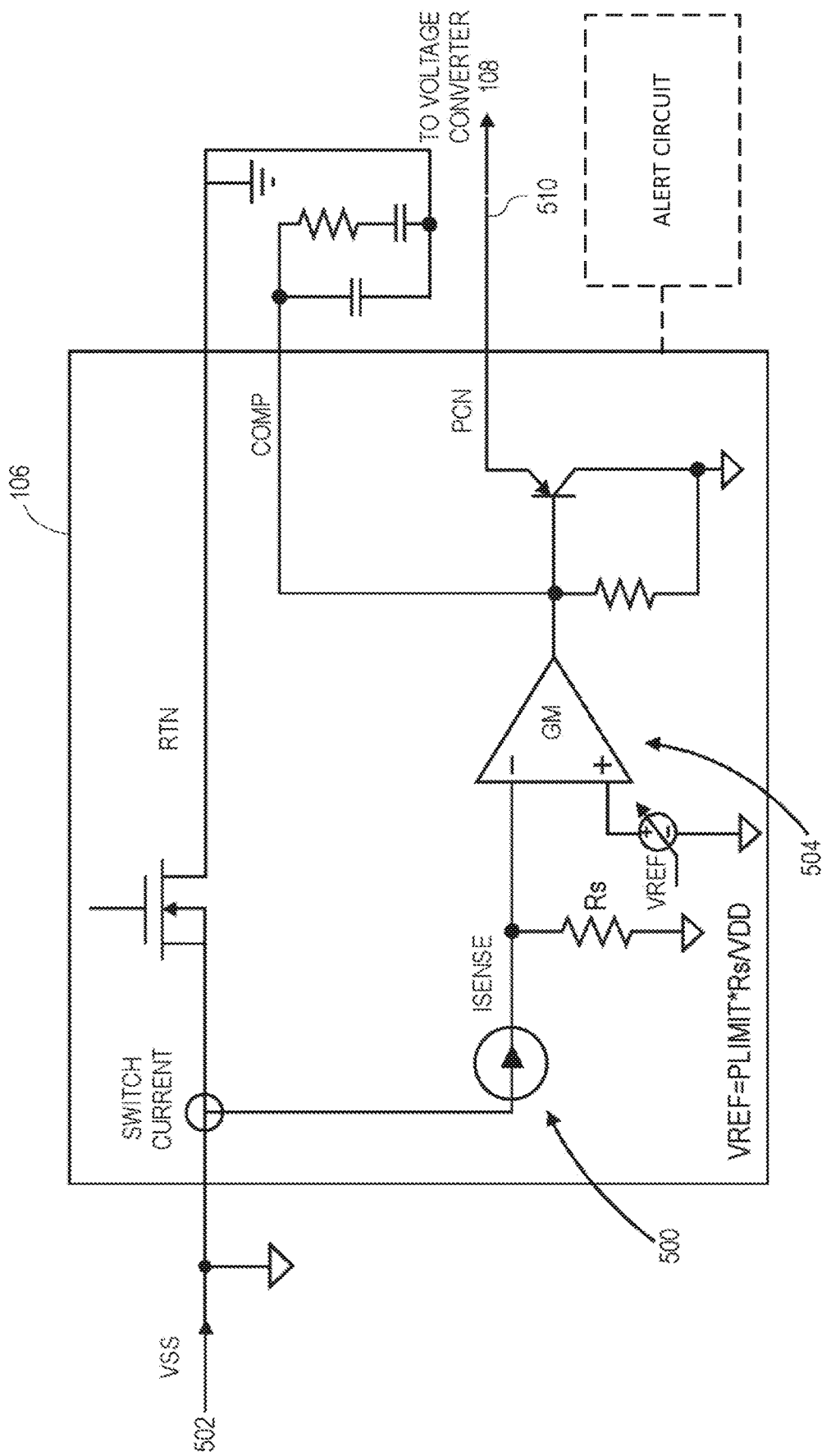
FIG. 5A is a block diagram representation and circuit diagram of an embodiment of a powered device interface.

Referring to FIG. 5A, a block diagram representation and circuit diagram of an embodiment of the powered device interface 106 is shown. The powered device interface 106 includes a supply sensing circuit (indicated generally at 500) configured to sense an amount of power received by the powered device (indicated generally at 502). For example, the amount of power sensed by the supply sensing circuity 500 can include the power at the front end of the PD 100 received by the powered device interface 106. The powered device interface 106 is shown including a control circuit (indicated generally at 504) configured to cause the power demand requested by the PD 100 to be reduced when the power demand requested by the PD 100 exceeds the amount of power received by the PD 100. In the embodiment shown in FIG. 5A, the control circuit 504 utilizes a reference voltage ("VREF") that is dependent on a power value ("PLIMIT").

In an embodiment, the power value ("PLIMIT") is provided at a physical level from a classifications stage of the PSE 102 and the PD 100, such as through a mutual identification of the PSE 102 and the PD 100 via hardware connections. This classification can set an initial power budget for the PD 100. For example, the PD 100 can include one or more pins to create a classification current output (e.g., from connection to a resistor) to transmit current classification to the PSE 102 indicative of a base or initial power requirement or budget. The PSE 102 can then confirm that the power budget request of the PD 100 is satisfied by the power allowed by the PSE 102 or whether the PD 100 should demote the amount of power requested by the PD 100 due to the capability constraints of the PSE 102. Following classification, a base or initial power level requested by the PD 100 is determined.

Figure 5B:
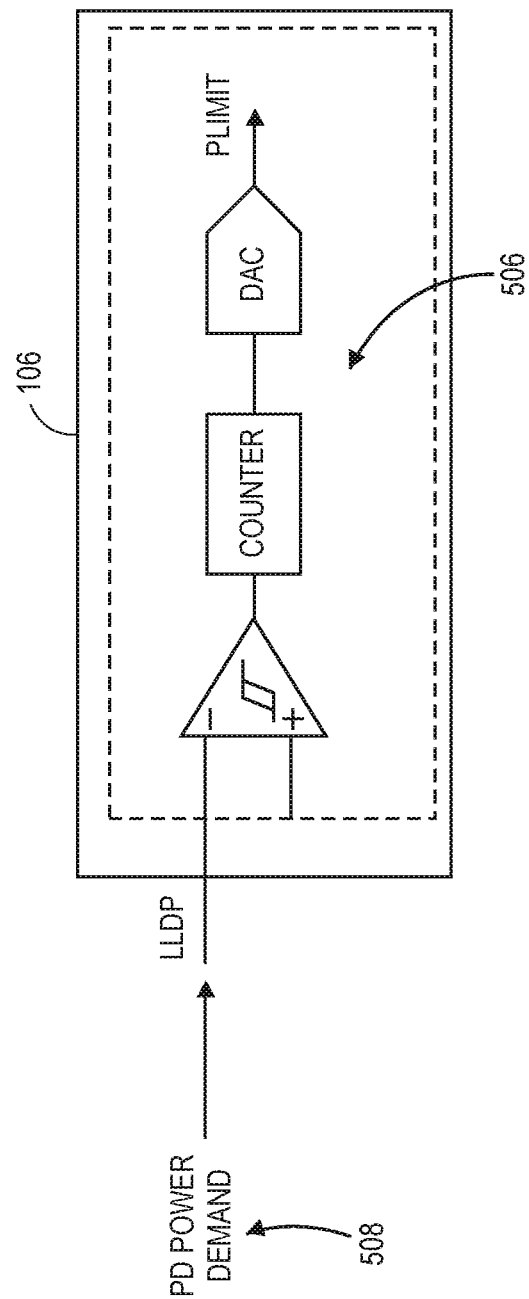
FIG. 5B is a block diagram representation and circuit diagram of an embodiment of a powered device interface.

In an embodiment, the power value ("PLIMIT") is provided by or revised through a demand sensing circuit of the powered device interface 106. For example, referring to FIG. 5B, a block diagram representation and circuit diagram of an embodiment of the powered device interface 106 is shown with a demand sensing circuit generally indicated at 506. In an embodiment, the demand sensing circuit 506 receives a power demand of the PD 100 as an input (shown generally as 508) and outputs the power value ("PLIMIT") as an output, where the power value ("PLIMIT") can be accessed by the control circuit 504 to determine whether the power demand of the PD 100 exceeds the power available to the PD 100. In an embodiment, the demand sensing circuit 506 receives the power demand from a microcontroller of the PD 100. Referring again to FIG. 5A, the control circuit 504 includes an output 510 to the voltage converter 108. In an embodiment, the output 510 is transferred to a front end of the voltage converter 108 to reduce the power demand requested by the PD 100 when the power demand requested by the PD 100 exceeds the amount of power available to the PD 100. The power demand can be reduced through a reduction in functionality of the PD 100 or a system in in which the PD 100 is operating (e.g., reduction in a time of use for cooling components (e.g., fan operation uptime), reduction in a time of use for heating components (e.g., heater operation uptime), reduction in camera or imaging resolution, reduction in camera or imaging speed, reduction in processing speed of the PD 100, reduction in a number of concurrent tasks managed by the PD 100), or combinations thereof. In an embodiment, the power budget to the PD 100 can be increased to a value that is more than what the previous classification determined. For example, the power demand could be increased due to less cable power loss along the ethernet cable as compared to the state of cable loss during the previous classification. The cable length of the ethernet cabling in PoE systems can influence the amount of power actually available for a given powered device, such as due to resistive losses in the cable. If the cable loss is less due to a shorter length of cable, the remainder of power from the power budget can be allocated into the PD 100.

Figure 6:
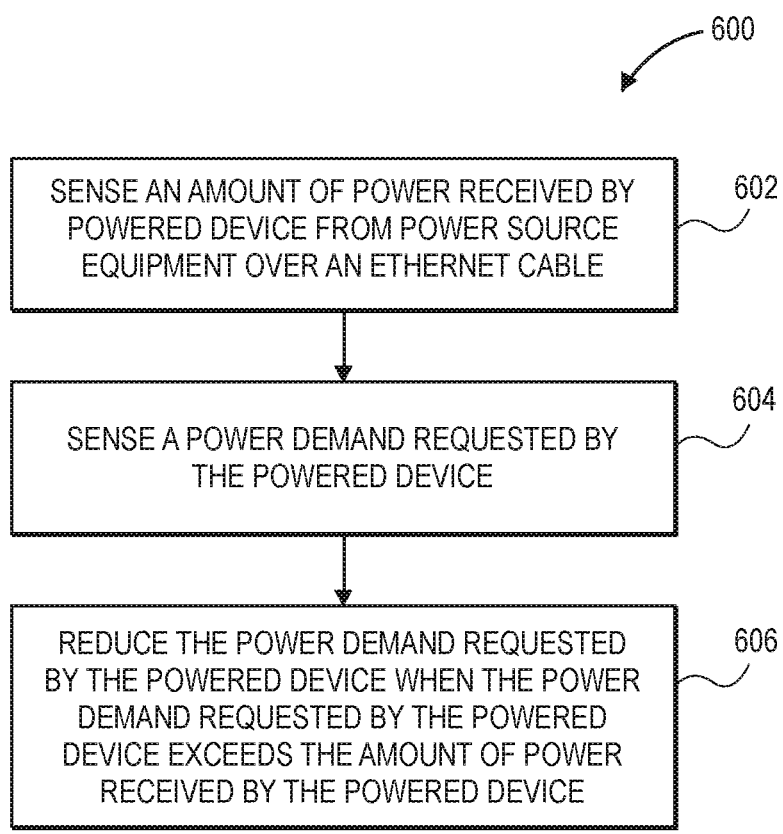
FIG. 6 is a flow chart representation of a method of implementing an embodiment of a powered device interface in a PoE system.

Referring to FIG. 6, a flow chart representation of a method 600 of implementing an embodiment of a powered device interface 106 in a PoE system is shown. At 602, an amount of power received by a powered device from power source equipment over an Ethernet cable is sensed. For example, the powered device interface 106 senses an amount of power received from the PSE 102 over the Ethernet cable 104. In an embodiment, the supply sensing circuit 500 of the powered device interface 106 senses the amount of power received from the PSE 102 over the Ethernet cable 104.

A power demand requested by the powered device is sensed at 604. For example, the powered device interface 106 senses a power demand requested by the PD 100. In an embodiment, the demand sensing circuit 506 of the powered device interface 106 senses the power demand requested by the PD 100 and outputs a value accessible by the powered device interface 106 to compare against the amount of power received from the PSE 102.

The power demand requested by the powered device is reduced when the power demand requested by the powered device exceeds the amount of power available to the powered device at 606. For example, the powered device interface 106 can reduce the power demand requested by the PD 100 when the power demand requested by the PD 100 exceeds the amount of power available to the PD 100. In an embodiment, the control circuit 504 of the powered device interface 106 generates an output for the voltage converter 108 to reduce the power demand requested by the PD 100 when the power demand requested by the PD 100 exceeds the amount of power available to the PD 100.

While a series of steps have been described in connection with the method 600, a fewer number of the described steps and/or additional steps may be performed. Furthermore, while the steps have been described in a particular order, the steps in method 600 may be performed in a different order.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A powered device interface for a powered device in a system employing power over ethernet, the powered device interface comprising:

a supply sensing circuit configured to sense an amount of power allowed by at least one power source equipment over an ethernet cable;

a demand sensing circuit configured to sense a power demand requested by the powered device; and a control circuit coupled with the supply sensing circuit and the demand sensing circuit, the control circuit configured to cause the power demand requested by the powered device to be reduced when the power demand requested by the powered device exceeds the amount of power allowed by the power source equipment for the powered device via reduction of at least one of the functionality of the powered device or the functionality of a system in which the powered device is operating wherein the control circuit is configured to transmit an output to a front end of a voltage converter to reduce the power demand requested by the powered device when the power demand requested by the powered device exceeds the amount of power allowed by the power source equipment for the powered device.

2. The powered device interface of claim 1, wherein the voltage converter includes a DC-DC converter.

3. The powered device interface of claim 1, wherein the supply sensing circuit is configured to sense the amount of power allowed by the power source equipment for the powered device by sensing a current allowed by the power source equipment for the powered device over the ethernet cable and an input voltage of the powered device.

4. The powered device interface of claim 1, wherein the control circuit is configured to cause the power demand requested by the powered device to be reduced when the power demand requested by the powered device exceeds the amount of power allowed by the power source equipment for the powered device by limiting current utilized by the powered device when the power demand requested by the powered device exceeds the amount of power allowed by the power source equipment for the powered device.

5. The powered device interface of claim 1, wherein the control circuit is configured to cause the power demand requested by the powered device to be reduced when the power demand requested by the powered device exceeds the amount of power allowed by the power source equipment for the powered device via reduction of the functionality of the powered device reduction, and wherein the functionality of the powered device includes a number of concurrent tasks managed by the powered device.

6. The powered device interface of claim 1, wherein the power allowed by the power source equipment for the powered device from at least one power source equipment over an ethernet cable is sourced from a single power source controller of the power source equipment.

7. The powered device interface of claim 1, wherein the power allowed by the power source equipment for the powered device from at least one power source equipment over an ethernet cable is sourced from a plurality of power source controllers.

8. A powered device in a system employing power over ethernet, the powered device comprising:

a powered device interface including a supply sensing circuit configured to sense an amount of power allowed by the power source equipment for the powered device from at least one power source equipment over an ethernet cable, a demand sensing circuit configured to sense a power demand requested by the powered device, and a control circuit coupled with the supply sensing circuit and the demand sensing circuit, the control circuit configured to cause the power demand requested by the powered device to be reduced when the power demand requested by the powered device exceeds the amount of power allowed by the power source equipment for the powered device via reduction of at least one of the functionality of the powered device or the functionality of a system in which the powered device is operating; and an ALERT circuit configured to assert a warning signal to the system to reduce a power consumption of the system: and a voltage converter coupled with the powered device interface at a front end of the voltage converter, the voltage converter configured to receive an output from the control circuit to reduce the power demand requested by the powered device when the power demand requested by the powered device exceeds the amount of power allowed by the power source equipment for the powered device.

9. The powered device of claim 8, wherein the voltage converter includes a DC-DC converter.

10. The powered device of claim 8, wherein the supply sensing circuit is configured to sense the amount of power allowed by the power source equipment for the powered device by sensing a current received by the powered device over the ethernet cable and an input voltage of the powered device.

11. The powered device of claim 8, wherein the control circuit is configured to cause the power demand requested by the powered device to be reduced when the power demand requested by the powered device exceeds the amount of power allowed by the power source equipment for the powered device by limiting current utilized by the powered device when the power demand requested by the powered device exceeds the amount of power allowed by the power source equipment for the powered device.

12. The powered device interface of claim 8, wherein the control circuit is configured to cause the power demand requested by the powered device to be reduced when the power demand requested by the powered device exceeds the amount of power allowed by the power source equipment for the powered device via reduction of the functionality of the powered device reduction, and wherein the functionality of the powered device includes a number of concurrent tasks managed by the powered device.

13. The powered device interface of claim 8, wherein the power allowed by the power source equipment for the powered device from at least one power source equipment over an ethernet cable is sourced from a single power source controller of the power source equipment.

14. The powered device interface of claim 8, wherein the power allowed by the power source equipment for the powered device from at least one power source equipment over an ethernet cable is sourced from a plurality of power source controllers.

15. The powered device interface of claim 14, wherein the control circuit is configured to cause the power demand requested by the powered device to be reduced when the power demand requested by the powered device exceeds the amount of power allowed by any power source controller of the plurality of power source controllers.

16. A method for limiting power requested by a powered device in a system employing power over ethernet, the method comprising:

sensing, via a supply sensing circuit, an amount of power allowed by the power source equipment for the powered device from at least one power source equipment over an ethernet cable;

sensing, via a demand sensing circuit, a power demand requested by the powered device; and reducing the power demand requested by the powered device, via a control circuit coupled with the supply sensing circuit and the demand sensing circuit configured to reduce of at least one of the functionality of the powered device or the functionality of a system in which the powered device is operating, when the power demand requested by the powered device exceeds the amount of power allowed by the power source equipment for the powered device by transmitting an output from the control circuit to a front end of a voltage converter to reduce the power demand requested by the powered device when the power demand requested by the powered device exceeds the amount of power allowed by the power source equipment for the powered device.

17. The method of claim 16, wherein sensing, via a supply sensing circuit, an amount of power received by the powered device from at least one power source equipment over an ethernet cable includes sensing, via the supply sensing circuit, a current received by the powered device from at least one power source equipment over the ethernet cable.

18. The method of claim 16, wherein the power allowed by the power source equipment for the powered device from at least one power source equipment over an ethernet cable is sourced from a single power source controller of the power source equipment.

19. The method of claim 16, wherein the power allowed by the power source equipment for the powered device from at least one power source equipment over an ethernet cable is sourced from a plurality of power source controllers.

* * * * *